(12) United States Patent
Zhao

(10) Patent No.: US 8,169,245 B2
(45) Date of Patent: May 1, 2012

(54) DUTY TRANSITION CONTROL IN PULSE WIDTH MODULATION SIGNALING

(75) Inventor: Bin Zhao, Irvine, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 263 days.

(21) Appl. No.: 12/703,249

(22) Filed: Feb. 10, 2010

(65) Prior Publication Data
US 2011/0193605 A1  Aug. 11, 2011

(51) Int. Cl.
*H03K 3/017* (2006.01)
(52) U.S. Cl. ......................... 327/175; 327/172
(58) Field of Classification Search .................. None
See application file for complete search history.

(56) References Cited

U.S. PATENT DOCUMENTS

| | | | |
|---|---|---|---|
| 4,162,444 A | 7/1979 | Rodgers | |
| 4,615,029 A | 9/1986 | Hu et al. | |
| 4,649,432 A | 3/1987 | Watanabe et al. | |
| 4,686,640 A | 8/1987 | Simison | |
| 5,025,176 A | 6/1991 | Takeno | |
| 5,038,055 A | 8/1991 | Kinoshita | |
| 5,508,909 A | 4/1996 | Maxwell et al. | |
| 5,723,950 A | 3/1998 | Wei et al. | |
| 5,898,329 A | 4/1999 | Hopkins | |
| 6,281,822 B1 | 8/2001 | Park | |
| 6,864,641 B2 | 3/2005 | Dygert | |
| 6,937,084 B2 * | 8/2005 | Bowling | 327/393 |
| 6,943,500 B2 | 9/2005 | LeChevalier | |
| 6,995,592 B2 * | 2/2006 | Agarwal | 327/172 |
| 7,106,294 B2 | 9/2006 | Kumamoto et al. | |
| 7,126,397 B1 | 10/2006 | Mok | |
| 7,262,724 B2 | 8/2007 | Hughes et al. | |
| 7,391,280 B2 | 6/2008 | Hsu | |
| 7,436,378 B2 | 10/2008 | Ito et al. | |
| 7,511,545 B1 | 3/2009 | Kesler | |
| 7,593,243 B2 | 9/2009 | Ganev et al. | |
| 7,741,885 B1 | 6/2010 | Guo et al. | |
| 7,800,415 B2 | 9/2010 | Yedevelly et al. | |
| 2004/0208011 A1 | 10/2004 | Horiuchi et al. | |
| 2004/0232964 A1 | 11/2004 | Wiktor et al. | |
| 2004/0233144 A1 | 11/2004 | Rader et al. | |
| 2004/0251942 A1 | 12/2004 | Chiu et al. | |
| 2006/0064609 A1 | 3/2006 | Bryan | |
| 2006/0164142 A1 * | 7/2006 | Stanley | 327/172 |

(Continued)

OTHER PUBLICATIONS

Non-Final Office Action mailed Oct. 20, 2011 for U.S. Appl. No. 12/537,443, 22 pages.

(Continued)

*Primary Examiner* — Cassandra Cox

(57) ABSTRACT

A pulse width modulation (PWM) signal generator generates a PWM signal with an adjustable PWM duty based on a programmable or otherwise adjustable value. In response to a change or update to this value, the PWM signal generator initiates a duty transition process that generates a series of groups of PWM cycles that gradually transition from the original duty to the new duty. Each group includes a corresponding set of a predetermined number of PWM cycles that is repeated one or more times over a predetermined duration for the group. Each set has a certain proportion of PWM cycles having the new duty to PWM cycles having the original duty, whereby the proportion increases for each successive group of the series. This gradual transition in the PWM signal from the original duty to the new duty effectively provides an effective higher duty resolution for the PWM signal generator during the duty transition.

20 Claims, 4 Drawing Sheets

U.S. PATENT DOCUMENTS

| | | |
|---|---|---|
| 2006/0186830 A1 | 8/2006 | Shami et al. |
| 2007/0080911 A1 | 4/2007 | Liu et al. |
| 2007/0253330 A1 | 11/2007 | Tochio et al. |
| 2008/0054815 A1 | 3/2008 | Kotikalapoodi |
| 2008/0297067 A1 | 12/2008 | Wang et al. |
| 2009/0073735 A1 | 3/2009 | Kesler |
| 2009/0128045 A1 | 5/2009 | Szczeszynski et al. |
| 2009/0187925 A1 | 7/2009 | Hu et al. |
| 2009/0230874 A1 | 9/2009 | Zhao et al. |
| 2009/0230891 A1 | 9/2009 | Zhao et al. |
| 2009/0273288 A1 | 11/2009 | Zhao et al. |
| 2009/0315481 A1 | 12/2009 | Zhao |
| 2010/0026203 A1 | 2/2010 | Zhao et al. |
| 2010/0085295 A1 | 4/2010 | Zhao et al. |

OTHER PUBLICATIONS

Mc Nerney, Tim, "constant-current power supply for Luxeon 5W LED with low-voltage warning and shut-off Software Documentation, as shipped to Mali in first 45 prototypes," Nov. 2004, www.designthatmatters.org/ke/pubs/kled-doc.txt, 5 pages.

Maxim: "Application Note 810, Understanding Flash ADCs," Oct. 2, 2001, 8 pages.

National Semiconductor Data Sheet: "LM3432/LM3432B 6-Channel Current Regulator for LED Backlight Application," May 22, 2008, pp. 1-18.

U.S. Appl. No. 12/537,443, filed Aug. 7, 2009, entitled "Pulse Width Modulation Frequency Conversion".

U.S. Appl. No. 12/703,239, filed Feb. 10, 2010, entitled "Pulse Width Modulation With Effective High Duty Resolution".

U.S. Appl. No. 12/537,692, filed Aug. 7, 2009, entitled "Phase-Shifted Pulse Width Modulation Signal Generation".

U.S. Appl. No. 12/625,818, filed Nov. 25, 2009, entitled "Synchronized Phase-Shifted Pulse Width Modulation Signal Generation".

International Application No. PCT/US2009/035284, Search Report and Written Opinion, Oct. 28, 2009, 11 pages.

Luke Huiyong Chung, Electronic Products: "Driver ICs for LED BLUs," May 1, 2008, 3 pages.

Akira Takahashi, Electronic Products: "Methods and features of LED drivers," Mar. 2008, 3 pages.

U.S. Appl. No. 12/340,985, filed Dec. 22, 2008, entitled "LED Driver With Feedback Calibration".

U.S. Appl. No. 12/326,963, filed Dec. 3, 2008, entitled "LED Driver With Precharge and Track/Hold".

U.S. Appl. No. 12/367,672, filed Feb. 9, 2009, entitled "Configuration for Dynamic Power Control in LED Displays".

U.S. Appl. No. 12/424,326, filed Apr. 15, 2009, entitled "Peak Detection With Digital Conversion".

U.S. Appl. No. 12/504,841, filed Jul. 17, 2009, entitled "Analog-To-Digital Converter With Non-Uniform Accuracy".

U.S. Appl. No. 12/690,972, filed Jan. 21, 2010, entitled "Serial Cascade of Minimum Tail Voltages of Subsets of LED Strings for Dynamic Power Contrl in LED Displays".

U.S. Appl. No. 12/363,607, filed Jan. 30, 2009, entitled "LED Driver With Dynamic Headroom Control".

Texas Instruments Publication, "Interleaved Dual PWM Controller with Programmable Max Duty Cycle," SLUS544A, (UCC28220, UCC28221) Sep. 2003, pp. 1-28.

Notice of Allowance mailed Oct. 5, 2010 for U.S. Appl. No. 12/537,692, 13 pages.

PCT Search Report mailed Mar. 28, 2011 for International Application No. PCT/US2010/044067, 3 pages.

U.S. Appl. No. 13/025,201, filed Feb. 11, 2011 entitled, "Phase-Shifted Pulse Width Modulation Signal Generation Device and Method Therefor".

* cited by examiner

DUTY TRANSITION CONTROL IN PULSE WIDTH MODULATION SIGNALING

FIELD OF THE DISCLOSURE

The present disclosure relates generally to pulse width modulation (PWM) and more particularly to controlling a duty of a PWM signal.

BACKGROUND

Pulse width modulation (PWM) signals often are used in display systems for precise control of display backlights or display screens. In such systems, the duty of a PWM control signal can change frequently, such as when the backlighting changes concurrent with displayed video content. Relatively large and abrupt changes in the duty of the PWM control signal result in relatively large and abrupt changes in light intensity, which may be detected as flicker by a viewer or may otherwise cause discomfort to a viewer. One conventional approach to reduce this effect is to implement a PWM generator with a relatively high duty resolution such that a one least-significant-bit (LSB) change in the PWM duty of the PWM generator produces a sufficiently small step change in the light intensity and thus no abrupt change will be detected by the viewer. However, the implementation of sufficiently high resolution control for PWM duty control typically requires significantly higher clocking frequencies and severely constrained timing requirements, thereby resulting in increased cost, power consumption, and silicon area for conventional high resolution implementations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate a pulse width modulation (PWM) signal generator for generating a PWM signal with an adjustable PWM duty (also commonly referred to as the "duty ratio"). The PWM signal generator receives a programmable or otherwise adjustable value representing the duty to be implemented in the output PWM signal. In response to a change or update to this value, the PWM signal generator initiates a duty transition process so as to transition the output PWM signal from the original duty to the new duty. The duty transition process generates a series of groups of PWM cycles that gradually transition from the original duty to the new duty. Each group includes a corresponding set of a predetermined number of PWM cycles that is repeated one or more times over a predetermined duration. Each set has a certain proportion of PWM cycles with the new duty to PWM cycles with the original duty, whereby this proportion increases for each successive group of the series. This gradual transition in the PWM signal from the original duty to the new duty effectively provides an effective higher duty resolution for the PWM signal generator for the transition without requiring the higher frequencies, tighter timing constraints, and increased silicon area and power consumption of conventional higher resolution PWM drivers. The increased effective resolution for the duty transition permits implementation of duty changes in the PWM signal while reducing or avoiding the negative impacts of such changes. To illustrate, the increased effective resolution for the duty transition permits duty changes in the PWM signals that drive light-generating components of display systems in a manner that results in corresponding change in light intensity that is sufficiently gradual so as to be imperceptible to a viewer.

Figure 1:
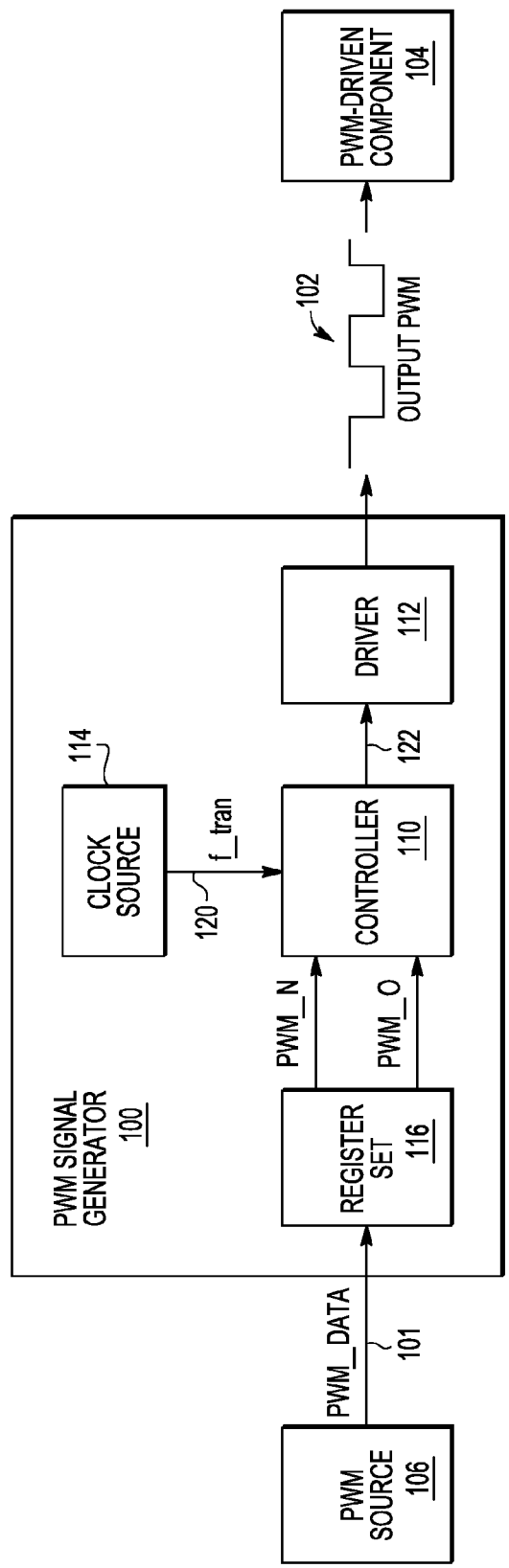
FIG. 1 is a diagram illustrating a pulse width modulation (PWM) signal generator implementing increased effective resolution during PWM duty transitions in accordance with at least one embodiment of the present invention.

FIG. 1 illustrates a PWM signal generator 100 in accordance with at least one embodiment of the present disclosure. The PWM signal generator 100 receives a PWM duty value 101, also identified as "PWM_DATA", and generates one or more PWM cycles having a duty corresponding to the PWM duty value 101 for an output PWM signal 102. The output PWM signal 102 then may be used to drive or otherwise control the operation of one or more PWM-driven components 104. Although FIG. 1 illustrates a single output PWM signal 102 generated by the PWM signal generator 100 from the PWM duty value 101 for ease of illustration, any number of output PWM signals may be generated in parallel in accordance with the techniques described herein.

The PWM-driven component 104 can include, for example, light emitting diodes (LEDs) of a LED-based display or an electronic motor. The PWM duty value 101 is provided by a PWM source 106, which can include, for example, a video processing device or a graphics processor for a context whereby the PWM duty value 101 is used to control a backlight intensity or screen intensity of a display. As another example, the PWM source 106 can include a microcontroller for a context whereby the PWM duty value 101 is used to control a speed of a motor.

In the illustrated embodiment, the PWM signal generator 100 includes a controller 110, a driver 112, a clock source 114, and a register set 116. The clock source 114 includes one or more oscillators or other clock generators to generate a transition timing clock signal 120 having a frequency f_tran. The driver 112 includes an input to receive a control signal 122 and an output to provide the output PWM signal 102, whereby the driver 112 pulls the output PWM signal 102 to either a high reference voltage (e.g., Vdd or logic "1") or to a low reference voltage (e.g., Vss or logic "0") responsive to the state of the control signal 122. The register set 116 includes a plurality of registers or other storage components, such as a cache, to store various values, including the original value of the PWM duty value 101 (referred to herein as "PWM_O") prior to duty update, the new value of the PWM duty value 101 (referred to herein as "PWM_N") after a duty update, and a plurality of variables utilized by the controller 110 as described in greater detail with reference to FIG. 3. The controller 110 uses the transition timing clock signal 120 and the values stored in the register set 116 to control the state of the control signal 122; that is, to control the driver 112 in generating the output PWM signal 102. The functionality of controller 110 can be implemented as hardware, firmware, one or more processors that execute software representative of the corresponding functionality, or a combination thereof. To illustrate, the controller can be implemented as discrete logic, an application specific integrated circuit (ASIC) device, a field programmable gate array (FPGA), and the like.

The controller 110 implements two modes for controlling the driver 112 depending on the status of the PWM duty value 101: a steady-state mode for generating, in the output PWM signal 102, PWM cycles having the duty reflected by a recently unchanged value for the PWM duty value 101; and a transition mode for transitioning from the original duty implemented in the output PWM signal 102 to a new duty in response to an update to the PWM duty value 101. The terms "original" and "new", with reference to duties, are used relative to a given duty update, whereby the "original" duty relative to a duty update is the duty implemented prior to the update and the "new" duty relative to the duty update is the duty implemented subsequent to the update. As such, the "new" duty for one duty update becomes the "original" duty for the following duty update. Further, in the event that a second duty update occurs during the transition process for a first duty update, the duty implemented before the transition remains the "original" duty and the second duty update replaces the first duty update as the "new" duty.

In the steady-state mode, the controller 110 times the generation of each PWM cycle using a value pwm_out that reflects the original value of PWM duty value 101 and is a measure of the duty of the corresponding PWM cycle. To illustrate, in an example implementation the value pwm_out can be used by the controller 110 to time the active portion of the corresponding PWM cycle as measured in cycles of a timing clock signal. Other techniques for generating a PWM cycle using the pwm_out value as a representation of the duty can be used without departing from the scope of the present disclosure.

In the transition mode, the controller 110 gradually transitions the average duty of the output PWM signal 102 from the original duty (PWM_O) to the new duty (PWM_N) by generating a series of groups of PWM cycles in the output PWM signal 102 for the duty transition process. Each group lasts for a predetermined duration, during which one or more iterations of a corresponding set of PWM cycles are generated in the output PWM signal 102. Each set has a corresponding subset of PWM cycles with the original duty and a corresponding subset of PWM cycles with the new duty, whereby the particular ratio of the number of PWM cycles with the original duty and the number of PWM cycles with the new duty decreases as the controller 110 progresses through the series. To illustrate, the sets implemented in the series of groups each could be implemented as eight PWM cycles, with the initial group of the series having one or more iterations of a set with one PWM cycle with the new duty and seven PWM cycles with the original duty and the last group of the series having one or more iterations of a set with seven PWM cycles with the new duty and one PWM cycle with the original duty. The set of each successive intermediate group then would have one more PWM cycle having the new duty and one less PWM cycle having the original duty than the set of the prior group in the series.

Figure 2:
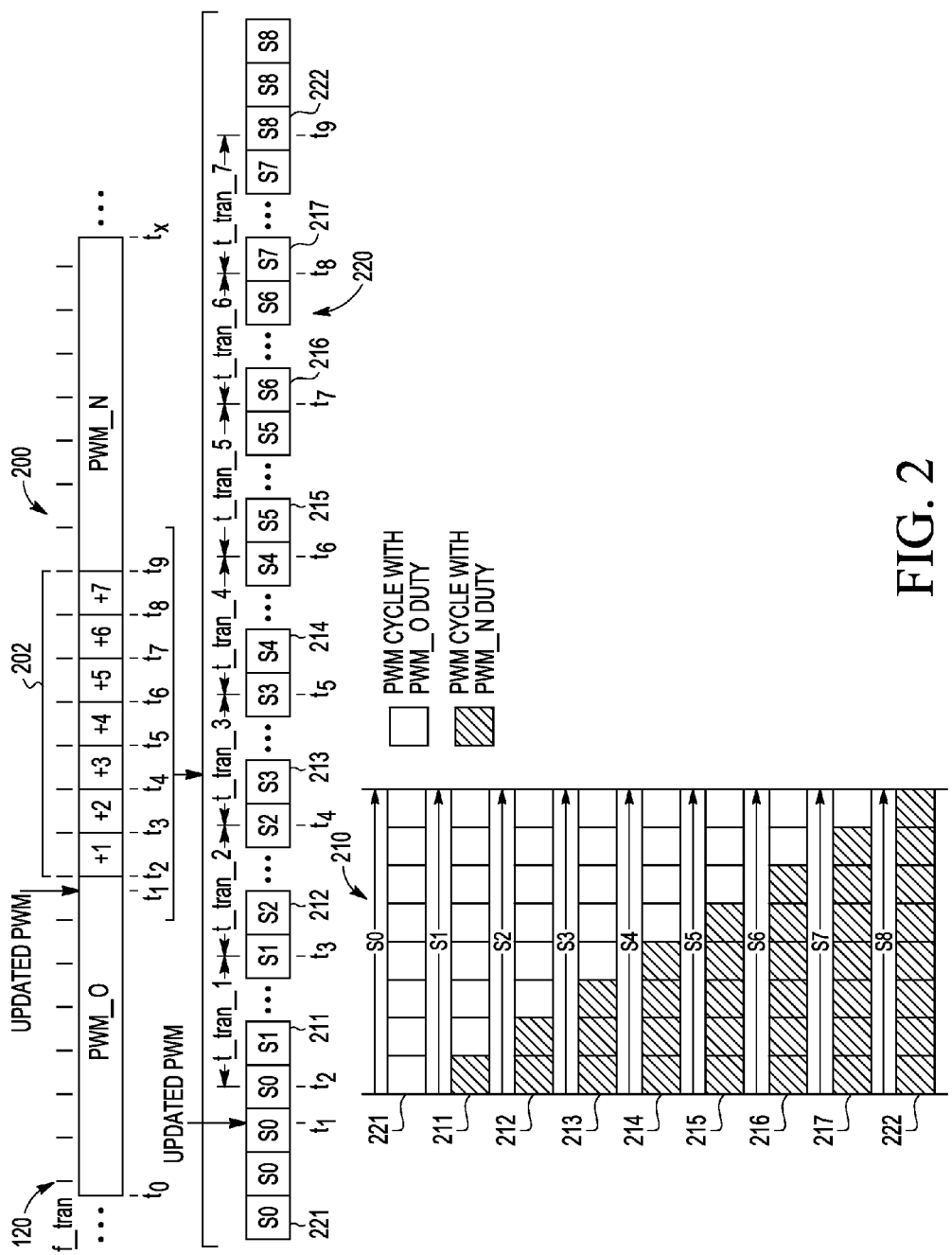
FIG. 2 is a diagram illustrating an example duty transition process implemented by the PWM signal generator of FIG. 1 in accordance with at least one embodiment of the present invention.

FIG. 2 illustrates an example operation of the transition mode of the PWM signal generator 100 for transitioning from the duty PWM_O to the duty PWM_N. In the depicted example, the timeline 200 represents the output PWM cycle 102 from a time $t_0$ prior to an update to the PWM duty value 101 to a time $t_x$ following completion of the transition process. The tick marks above the timeline 200 represent the periods of cycles of the transition timing clock 120.

At time $t_0$ the PWM signal generator 100 is operating in steady-state mode and therefore is generating PWM cycles having the duty PWM_O for the output PWM cycle 102. At time t1, the PWM source 106 provides an updated PWM duty value 101 with a value of PWM_N (that is, PWM_DATA=PWM_N), in response to which the controller 110 enters the transition mode so as to gradually transition the duty of the output PWM cycle 102 to the duty PWM_N.

As described in greater detail below, the timing of the transition process is linked to the transition timing clock signal 120. Accordingly, rather than start the series of groups of PWM cycles immediately following receipt of the updated duty value, the controller 110 waits until the start of the next cycle of the transition timing clock signal 120 at time $t_2$ and then initiates generation of a series 202 of groups of PWM cycles. In the illustrated example, the series 202 comprises seven groups that are identified in FIG. 2 as "+1", "+2", "+3", "+4", "+5", "+6", and "+7." Each group comprises one or more iterations of a corresponding set of PWM cycles. The sets in the groups all have the same number of PWM cycles, which in the illustrated example is eight PWM cycles per set. In a non-limiting example, the typical range of the duration of the series 202 typically is between 10 milliseconds to 500 milliseconds, although other durations may be used for the series 202 depending on the desired visual effect.

Set diagram 210 illustrates the particular composition of the set implemented in each corresponding group, whereby each box in the set diagram 210 represents a corresponding PWM cycle. Those boxes without hatching represent PWM cycles with the duty PWM_O and those boxes with hatching represent PWM cycles with the duty PWM_N. As illustrated by the set diagram 210, the initial group, "+1", implements multiple iterations of a set 211 having one PWM cycle with the duty PWM_N and seven PWM cycles with the duty PWM_O (for a ratio of 1:7); the second group in the series, "+2", implements multiple iterations of a set 212 having two PWM cycles with the duty PWM_N and six PWM cycles with the duty PWM_O (for a ratio of 2:6); the third group in the series, "+3", implements multiple iterations of a set 213 having three PWM cycles with the duty PWM_N and five PWM cycles with the duty PWM_O (for a ratio of 3:5); the fourth group in the series, "+4", implements multiple iterations of a set 214 having four PWM cycles with the duty PWM_N and four PWM cycles with the duty PWM_O (for a ratio of 4:4); the fifth group in the series, "+5", implements multiple iterations of a set 215 having five PWM cycles with the duty PWM_N and three PWM cycles with the duty PWM_O (for a ratio of 5:3); the sixth group in the series, "+6", implements multiple iterations of a set 216 having six PWM cycles with the duty PWM_N and two PWM cycles with the duty PWM_O (for a ratio of 6:2); and the seventh and final group in the series, "+7", implements multiple iterations of a set 217 having seven PWM cycles with the duty PWM_N and one PWM cycles with the duty PWM_O (for a ratio of 7:1). Thus, in this example, the number associated with each group ("+1", "+2", etc.) also represents the number of PWM cycles having the new duty PWM_N in the set implemented for the corresponding group.

In the example of FIG. 2, the PWM cycles having the duty PWM_N are grouped at the start of the corresponding set. However, in other implementations the PWM cycles having the duty PWM_N could be grouped at the end of the corresponding set, or they could be dispersed among the corresponding set. Further, the particular transition pattern of the increase in the number of PWM cycles having the new duty and, correspondingly, the decrease in the number of PWM cycles having the original duty can be a function of the particular number of groups in the series 202 and the number of PWM cycles per set. To illustrate because there are eight PWM cycles per set and seven groups in the series 202 in the example of FIG. 2, each successive group in the series 202 implements a corresponding set with one more PWM cycle having the new duty PWM_N and one less PWM cycle having the original duty PWM_O than the set used in the previous group. However, in other embodiments a different target pattern of increase/decrease can be programmed into the controller 110. For example, the target pattern could be configured to non-linearly increase the number of PWM cycles having the new duty for each set in the progression of the series. To illustrate, the target pattern could be an exponential increase such that the first group could implement a set composed of one PWM cycle having the new duty and fifteen PWM cycles having the original duty, the second group could implement a set composed of two PWM cycles having the new duty and fourteen PWM cycles having the original duty, the third group could implement a set composed of four PWM cycles having the new duty and twelve PWM cycles having the original duty, and so on.

Timing diagram 220 of FIG. 2 illustrates the duty transition using the series 202 of groups of PWM cycles in expanded detail. As described in greater detail with reference to FIG. 3, the controller 110 generates the output PWM signal 102 as a series of sets of PWM cycles regardless of whether the controller 110 is operating in the steady-state mode or the transition mode so as to simplify the algorithm implemented by the controller 110. Further, the generation of each set is atomic; that is, the controller 110 does not prematurely terminate a particular set to start a new set during operation. Accordingly, as illustrated by timing diagram 220, while in steady-state mode the controller 110 generates iterations of a set 221 composed entirely of PWM cycles having the original duty PWM_O. As noted, the PWM duty value 101 is updated to PWM_N at time $t_1$ and thus the controller 110 initiates the duty transition process at the start of the next cycle of the transition timing clock signal 120 at time $t_2$. However, because an iteration of the set 221 was started just prior to the start of the next cycle of the transition timing clock signal 120, the controller 110 waits until this set 221 is completed before initiating the series 202 with the first group "+1". To implement the first group "+1", the controller 110 begins a first iteration of the set 211 following completion of the last set 221 and continues with iterations of the set 211 until the start of the next cycle of the transition timing clock signal 120 at time $t_3$. The iteration of the set 211 being conducted at time $t_3$ is permitted to complete, at which time the controller 110 initiates the second group "+2" with a first iteration of the set 212. The controller 110 continues with iterations of the set 212 until the start of the next cycle of the transition timing clock signal 120 at time $t_4$. Following completion of the iteration of the set 212 being conducted at time t4, the controller 110 initiates the third group "+3" with a first iteration of the set 213. This process continues until all seven groups have been completed at time $t_9$, at which point the controller 110 returns to steady-state mode with the generation of iterations of a set 222 composed entirely of PWM cycles having the new duty PWM_N.

As the example of FIG. 2 illustrates, the duty transition process implemented by the controller 110 can reduce or eliminate relatively large steps in the effective duty of the output PWM signal 102 perceived by a viewer. The series 202 of groups of PWM cycles is implemented that the number of PWM cycles having the new duty per set increases and the number of PWM cycles having the original duty per set decreases as the series progresses, thereby providing a smoothed transition from the original duty to the new duty. In display applications, this smoothed transition typically results in sufficiently small incremental increases in the light intensity, on average, so that no abrupt change is perceived by the viewer. To illustrate, a 10-bit (10 b) duty resolution in a conventional PWM generator would result in a minimum change step in light intensity of approximately 0.097%, which potentially is noticeable by many viewers. In the example of FIG. 2 the transition is implemented over a series of seven groups ($2^3-1$). Assuming the PWM signal generator 100 has a native duty resolution of 10 b, the effective duty resolution for the PWM signal generator 100 during the transition process would be 13-bit ($2^{10}*2^3$), which a corresponding minimum change step in light intensity of 0.012%, which is generally recognized as an undetectable abrupt change in light intensity by human eyes. As such, the PWM signal generator 100 can provide a higher effective duty resolution during transitions in the duty of the output PWM signal 102 while avoiding the negative impacts of conventional higher resolution PWM generators, including a greater number of PWM control bits, the need for higher frequency clocking, higher switching speed in the PWM cycles, the degraded accuracy in the PWM duty due to the rising/falling times of the PWM signal, and the like.

Although FIG. 2 illustrates a particular implementation whereby each set includes eight PWM cycles and the series 202 includes a progression of seven groups, the techniques disclosed herein are not limited to this example arrangement. In one embodiment, the number of groups in the series is based on the particular number of PWM cycles per set. To illustrate because the example of FIG. 2 has eight PWM cycles per set and because this example includes a linear increase in the proportion of PWM cycles having the new duty to the PWM cycles having the original duty as the series progresses, the series 202 is implemented as a progression seven groups so as to implement this linear progression. If each set included, for example, sixteen PWM cycles, a series of fifteen groups could be implemented to provide the same incremental linear transition pattern. In at least one embodiment, the number of PWM cycles per set is selected based on the difference between a desired effective duty resolution during the duty transition process and the native duty resolution of the PWM signal generator being implemented. To illustrate, it may determine that the small step size afforded by a 14 bit duty resolution would result in correspondingly small step changes in light intensity that would be imperceptible to a viewer. Accordingly, to implement an effective 14 bit duty resolution in, for example, a PWM signal generator with a native 10 bit duty resolution in accordance with the techniques disclosed herein, a set size of sixteen ($2^4$) PWM cycles could be selected so as to provide the desired 14 bit ($2^{10}*2^4$) effective duty resolution during the duty transition process.

Figure 3:
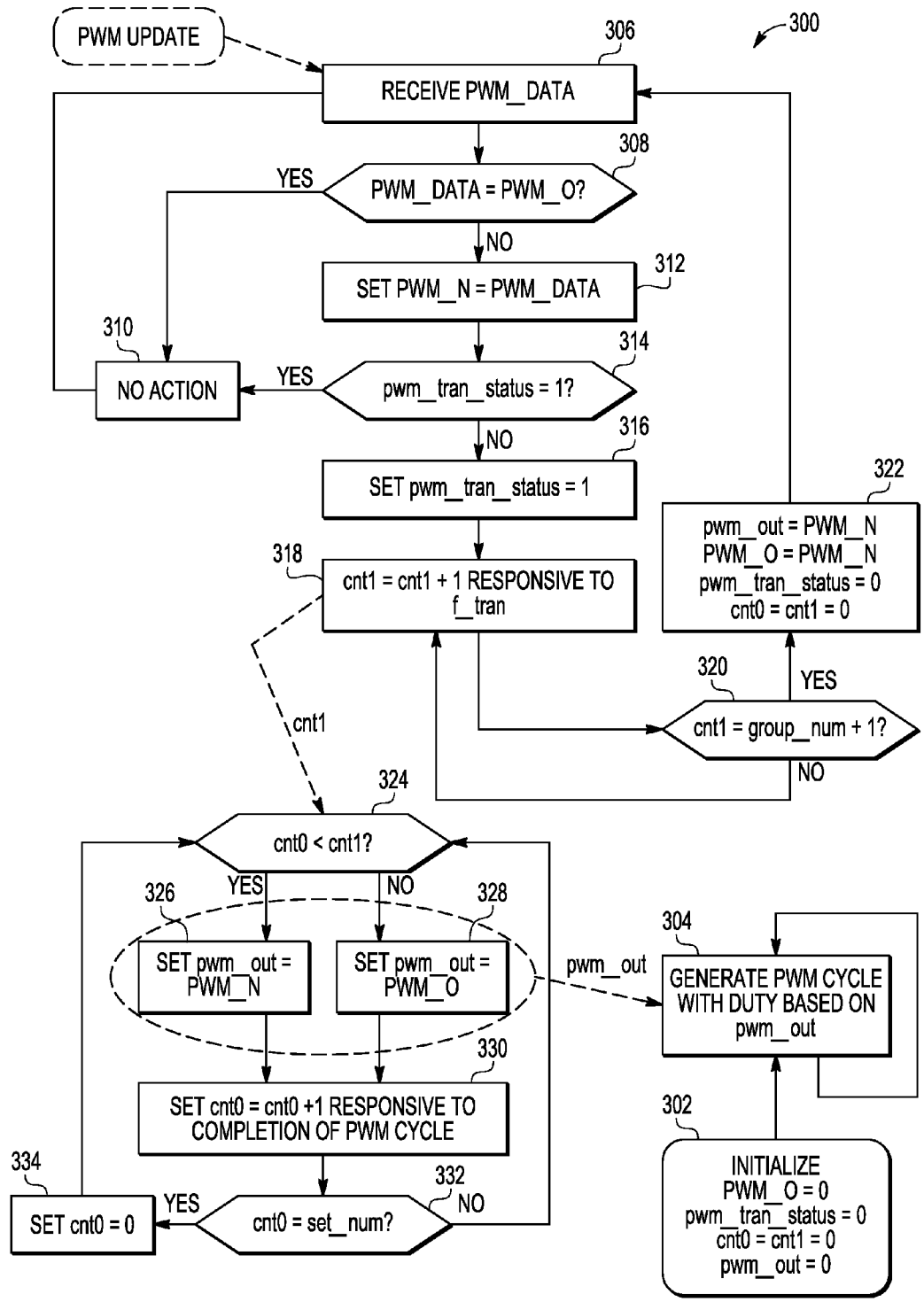
FIG. 3 is a diagram illustrating an example method of operation of the PWM signal generator of FIG. 1 in accordance with at least one embodiment of the present invention.

FIG. 3 illustrates an example method 300 of operation of the controller 110 for controlling generation of PWM cycles for the output PWM signal 102 in accordance with at least one embodiment of the present disclosure. For the following method 300, the controller 110 uses a number of variables stored in the register set 116 (FIG. 1), including: the value PWM_O representing the original duty implemented by the controller 110; the status flag pwm_tran_status, which indicates whether the controller 110 is in the transition mode ("1") or the steady-state mode ("0"); a count value cnt1, which is incremented by cycles of the transition timing clock signal 120 and is used to count the progression of groups of a series during a duty transition; a count value cnt0, which is incremented upon the completion of each PWM cycle in the output PWM signal 102 and is used to control whether the next PWM cycle to be generated for the output PWM signal 102 is to have the original duty or an new duty; a value pwm_out, which represents the actual PWM duty to be generated for the output PWM signal 102; a value set_num, which indicates the number of PWM cycles per set; and a value group_num, which indicates the number of groups to be implemented in a transition series. The values set_num and group_num may be preset for a given device implementing the PWM signal generator 100, or these values may be programmable or otherwise adjustable by a user or supplier of the device.

At block 302, the controller 110 initializes the variables used by the controller 110 in response to a power-on reset or other initiation event. This initialization process includes setting PWM_O, pwm_tran_status, count values cnt0 and cnt1, and pwm_out to zero. At block 304, the controller 110 then initiates the continual generation of a sequence of PWM cycles for the output PWM signal 102 based on the value pwm_out. For example, the value pwm_out could be used to time the active portion of the corresponding PWM cycle as measured by a corresponding number of cycles of a clock signal used to time the PWM cycle generation. Initially the value pwm_out is set to zero and thus the initial PWM cycles have a duty of zero. However, as described below, the value pwm_out is adjusted responsive to updates to the PWM duty value 101, thereby adjusting the duty of PWM cycles generated based on the adjusted value pwm_out.

In parallel with generation of PWM cycles at block 304, the controller 110 waits for any updates to the PWM duty value 101. At block 306, the PWM source 106 (FIG. 1) provides the PWM duty value 101 to the PWM signal generator 100. At block 308, the controller 110 compares the value PWM_DATA of the received PWM duty value 101 to the duty value PWM_O to determine whether there is an actual change or update to the original duty implemented by the controller 110. If they are the same value, at block 310 the controller 110 takes no further action with respect to the PWM duty value 101. Otherwise, if the original duty value PWM_O and the new duty value PWM_DATA are different, the controller 110 stores the new value PWM_DATA in the register set 116 as the value PWM_N at block 312. At block 314 the controller 110 checks the status flag pwm_tran_status to determine whether the controller 110 is already conducting a duty transition process for an earlier duty update. If so, the previous value of PWM_N is replaced by the new value of PWM_N, which contemporaneously changes the duty of the PWM cycles implemented as the "updated" PWM cycles in the transition series as described below. The controller 110 takes no further action at block 312 until the next update to the duty.

Returning to block 314, if the status flag pwm_tran_status does not indicate a duty transition is currently in process, at block 316 the controller 110 initiates the duty transition process to transition to the new duty and thus the controller 110 sets the status flag pwm_tran_status to "1". As described above, the duty transition process is implemented as a series of groups of PWM cycles, each group comprising one or more iterations of a corresponding set of PWM cycles, whereby the proportion of the PWM cycles having the new duty to the PWM cycles having the original duty in a given set increases with each successive group in the series. As also described above, the duration of each group is measured with respect to the transition timing clock signal 120. In this example, each group has a duration of one cycle of the transition timing clock signal 120. Accordingly, after setting the status flag pwm_tran_status to "1" at block 316 (thereby signaling the start of the series), the controller 110 measures the progression through the groups of the series by incrementing the count value cnt1 by one for every cycle of the transition timing clock signal 120 at block 318. The controller 110 can determine that the series has ended by comparing the count value cnt1 to the value group_num+1 at block 320, whereby the value group_num represents the number of groups to be implemented in the series. As such, the value group_num represents the threshold that indicates whether the series of groups has completed. Accordingly, when the count value cnt1 is incremented to a value equal to group_num+1, the duty transition process for the recent update ends. In response, at block 322 the controller initializes the variables in anticipation of the next duty update by setting pwm_out to PWM_N, by setting PWM_O to PWM_N, by clearing the status flag pwm_tran_status, and resetting the count values cnt0 and cnt1 to zero.

Concurrent with the processes represented by blocks 306, 308, 310, 312, 314, 316, 318, 320, and 322, the controller 110 uses the values of PWM_O and PWM_N and the count values cnt0 and cnt1 to control generation of the successive sets of PWM cycles in the output PWM cycle 102, including both the steady-state generation of sets composed entirely of the original duty and the transitional generation of the sets of the series whereby the proportion of PWM cycles having the new duty to PWM cycles having the original duty depends on the progress of the controller 110 through the series. In the following, it is assumed that the number of PWM cycles in a set is one greater than the number of groups the series (that is, set_num=group_num+1) so as to provide an incremental, linear transition pattern in the sets. Further, it is assumed that the first group of the series implements a set with only one PWM cycle having the new duty and that the last group of the series implements a set whereby all but one PWM cycle of the set have the new duty. Accordingly, as the series of groups progresses (as measured by the count value cnt1), the current group number (that is, the current value of cnt1) also represents the number of PWM cycles having the new duty to be implemented in the corresponding set for the current group. Thus, at block 324 the controller compares the count value cnt1 (representing the current group number) with the count value cnt0 (representing the current number of PWM cycles having the new duty that have been generated for the current set). In the event that the count value cnt0 is less than the count value cnt1 (i.e., in the event that additional PWM cycles having the new duty remain to be generated for the current set), at block 326 the controller 110 sets the value pwm_out to PWM_N, which results in the generation of a PWM cycle having the new duty at the next iteration of block 304. In the event that the count value cnt0 is not less than the count value cnt1 (i.e., in the event that the appropriate number of PWM cycles having the new duty have been generated for the current set), at block 328 the controller 110 sets the value pwm_out to PWM_O, which results in the generation of a PWM cycle having the original duty at the next iteration of block 304.

Concurrent with determining whether pwm_out is to be set to PWM_N or PWM_O based on the comparison of the count values cnt0 and cnt1, at block 330 the controller 110 increments the count value cnt0 in response to completion of each PWM cycle. As such, the count value cnt0 serves to count the number of PWM cycles generated for the current set. Accordingly, at block 332 the controller 110 compares the count value cnt0 to the value set_num to determine whether the current set has been completed. If the count value cnt0 is below the threshold represented by the value set_num, the controller 110 continues the process represented by blocks 324, 326, 328, and 330 for the next PWM cycle of the current set. Otherwise, if all of the PWM cycles for the current cycle have been generated, at block 334 the next set is started by resetting the count value cnt0 to zero and starting the process represented by blocks 324, 326, 328, and 330 anew.

The particular process of selecting a value for pwm_out (and thus selecting the duty to be implemented for the next PWM cycle to be generated for the output PWM signal 102) illustrated in FIG. 3 permits immediate implementation of a second update to the PWM duty value 101 that follows a first update within the duration of the transition process for the first update. To illustrate, assume that the first update of duty X (that is, PWM_N=X) is received and the transition process described above is initiated such that each set for the first four groups (of eight groups in the series for this example) is composed of one or more PWM cycles having the duty X and one or more PWM cycles having the original duty value through the selection process of blocks 324, 326, and 328. Further assume that the second update of duty Y is received at the end of the fourth group and the value PWM_N is overwritten with the value Y (that is, PWM_N=Y at the end of the fourth group). Accordingly, when the process of blocks begins for the fifth group, the selection process of blocks 324, 326, and 328 will result in the selection of either the original duty value or the second updated value Y as the value for pwm_out, and thus the sets of the fifth group through the eight group of the series will be composed of PWM cycles having the more recently updated duty Y rather than the less-recently updated duty X. As such, the relatively long duration of the transition process will not unnecessarily delay the timely incorporation of new updates to the duty that rapidly follow prior updates to the duty.

Figure 4:
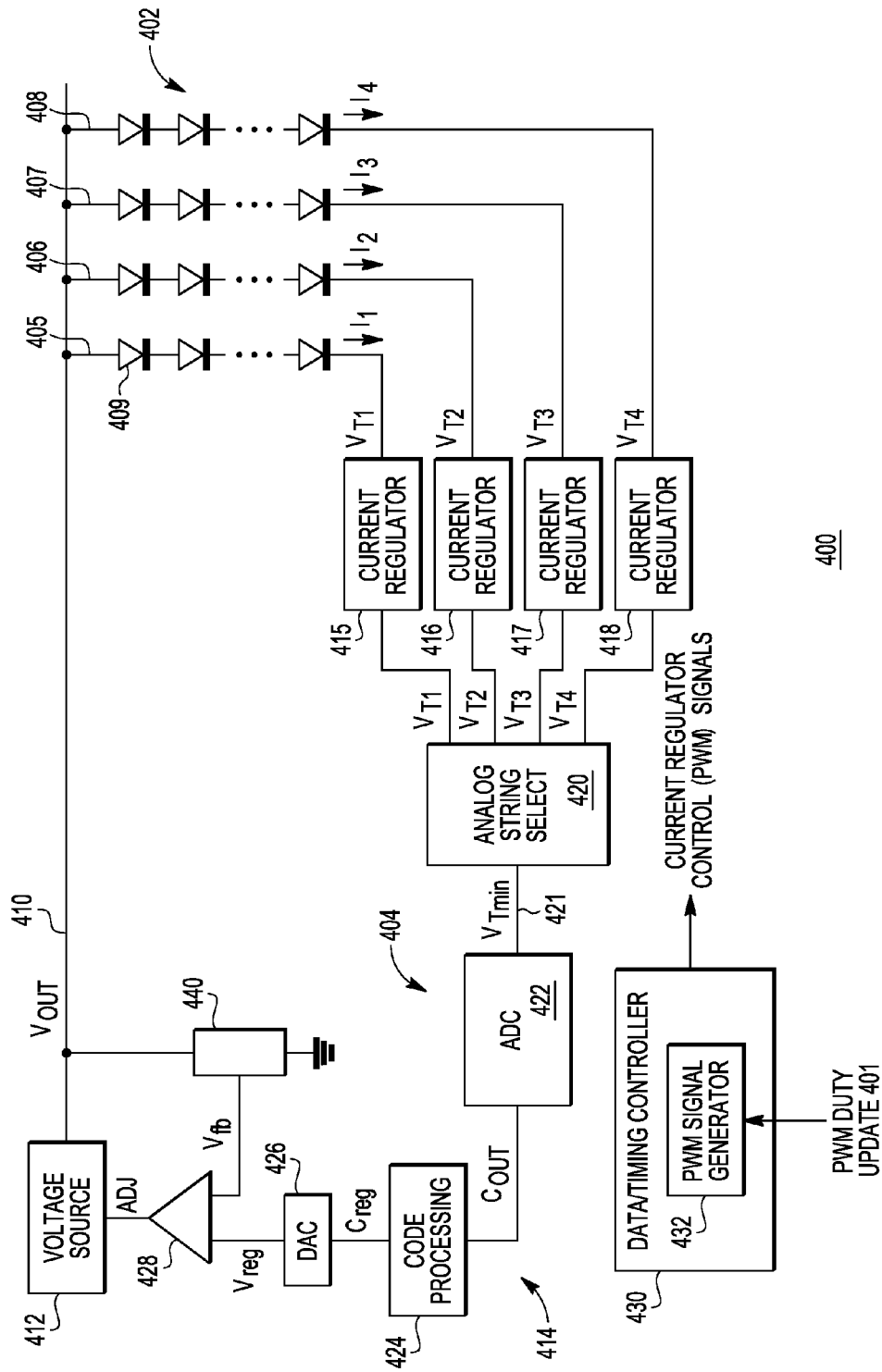
FIG. 4 is a diagram illustrating an example light emitting diode (LED) system implementing the PWM signal generator of FIG. 1 in accordance with at least one embodiment of the present invention.

FIG. 4 illustrates an example implementation of the PWM signal generator 100 of FIG. 1 for dynamic power management in a light emitting diode (LED) system 400 having a plurality of LED strings. The term "LED string," as used herein, refers to a grouping of one or more LEDs connected in series. The "head end" of a LED string is the end or portion of the LED string which receives the driving voltage/current and the "tail end" of the LED string is the opposite end or portion of the LED string. The term "tail voltage," as used herein, refers the voltage at the tail end of a LED string or representation thereof (e.g., a voltage-divided representation, an amplified representation, etc.). The term "subset of LED strings" refers to one or more LED strings.

In the depicted example, the LED system 400 includes a LED panel 402 and a LED driver 404. The LED panel 402 includes a plurality of LED strings (e.g., LED strings 405, 406, 407, and 408). Each LED string includes one or more LEDs 409 connected in series. The LEDs 409 can include, for example, white LEDs, red, green, blue (RGB) LEDs, organic LEDs (OLEDs), etc. Each LED string is driven by the adjustable voltage $V_{OUT}$ received at the head end of the LED string from a voltage source 412 of the LED driver 404 via a voltage bus 410 (e.g., a conductive trace, wire, etc.). In the embodiment of FIG. 4, the voltage source 412 is implemented as a DC/DC converter configured to drive the output voltage $V_{OUT}$ using a supplied input voltage.

The LED driver 404 includes a feedback controller 414 configured to control the voltage source 412 based on the tail voltages at the tail ends of the LED strings 405-408. The LED driver 404, in one embodiment, receives PWM duty values 401 (corresponding to the PWM duty value 101 of FIG. 1) that update or otherwise identifying the duty at which the LED strings 405-408 are to be driven, and the LED driver 404 is configured to activate the LED strings 405-408 based on the PWM duty value 401.

The feedback controller 414, in one embodiment, includes a plurality of current regulators (e.g., current regulators 415, 416, 417, and 418), an analog string select module 420, an ADC 422, a code processing module 424, a control digital-to-analog converter (DAC) 426, an error amplifier 428, and a data/timing controller 430. The data/timing controller 430 includes a PWM signal generator 432 (corresponding to the PWM signal generator 100, FIG. 1).

The current regulator 415 is configured to maintain the current $I_1$ flowing through the LED string 405 at or near a fixed current (e.g., 40 mA) when active. Likewise, the current regulators 416, 417, and 418 are configured to maintain the currents $I_2$, $I_3$, and $I_4$ flowing through the LED strings 406, 407, and 408, respectively, at or near the fixed current when active.

A current regulator typically operates more effectively when the input of the current regulator is a non-zero voltage so as to accommodate the variation in the input voltage that often results from the current regulation process of the current regulator. This buffering voltage often is referred to as the "headroom" of the current regulator. As the current regulators 415-418 are connected to the tail ends of the LED strings 405-408, respectively, the tail voltages of the LED strings 405-408 represent the amounts of headroom available at the corresponding current regulators 415-418. However, headroom in excess of that necessary for current regulation purposes results in unnecessary power consumption by the current regulator. Accordingly, as described in greater detail herein, the LED system 400 employs techniques to provide dynamic headroom control so as to maintain the minimum tail voltage of the active LED strings at or near a predetermined threshold voltage, thus maintaining the lowest headroom of the current regulators 415-418 at or near the predetermined threshold voltage. The threshold voltage can represent a determined balance between the need for sufficient headroom to permit proper current regulation by the current regulators 415-418 and the advantage of reduced power consumption by reducing the excess headroom at the current regulators 415-418.

The PWM signal generator 432 then generates a set of four output PWM signals in accordance with the techniques described above. Each output PWM signal is provided to a corresponding current regulator to control the activation of the corresponding LED strings. The analog string select module 420 includes a plurality of tail inputs coupled to the tail ends of the LED strings 405-408 to receive the tail voltages $V_{T1}$, $V_{T2}$, $V_{T3}$, and $V_{T4}$ of the LED strings 405-408, respectively, and an output to provide an analog signal 421 representative of the minimum tail voltage $V_{Tmin}$ of the LED strings 405-408 at any given point over a detection period. In one embodiment, the analog string select module 420 is implemented as a diode-OR circuit having a plurality of inputs connected to the tail ends of the LED strings 405-408 and an output to provide the analog signal 421.

The ADC 422 is configured to generate one or more digital code values $C_{OUT}$ representative of the voltage of the analog signal 421 at one or more corresponding sample points. The code processing module 424 includes an input to receive the one or more code values $C_{OUT}$ and an output to provide a code value $C_{reg}$ based on the minimum value of the received code values $C_{OUT}$ for a given detection period or a previous value for $C_{reg}$ from a previous detection period. As the code value $C_{OUT}$ represents the minimum tail voltage that occurred during the detection period (e.g., a PWM cycle, a display frame period, etc.) for all of the LED strings 405-408, the code processing module 424, in one embodiment, compares the code value $C_{OUT}$ to a threshold code value, $C_{thresh}$, and generates a code value $C_{reg}$ based on the comparison. The code processing module 424 can be implemented as hardware, software executed by one or more processors, or a combination thereof. To illustrate, the code processing module 424 can be implemented as a logic-based hardware state machine, software executed by a processor, and the like.

The control DAC 426 includes an input to receive the code value $C_{reg}$ and an output to provide a regulation voltage $V_{reg}$ representative of the code value $C_{reg}$. The regulation voltage $V_{reg}$ is provided to the error amplifier 428. The error amplifier 428 also receives a feedback voltage $V_{fb}$ representative of the output voltage $V_{OUT}$. In the illustrated embodiment, a voltage divider 440 is used to generate the voltage $V_{fb}$ from the output voltage $V_{OUT}$. The error amplifier 428 compares the voltage $V_{fb}$ and the voltage $V_{reg}$ and configures a signal ADJ based on this comparison. The voltage source 412 receives the signal ADJ and adjusts the output voltage $V_{OUT}$ based on the magnitude of the signal ADJ.

There may be considerable variation between the voltage drops across each of the LED strings 405-408 in the LED system 400 due to static variations in forward-voltage biases of the LEDs 409 of each LED string and dynamic variations due to the on/off cycling of the LEDs 409. Thus, there may be significant variance in the bias voltages needed to properly operate the LED strings 405-408. However, rather than drive a fixed output voltage $V_{OUT}$ that is substantially higher than what is needed for the smallest voltage drop as this is handled in conventional LED drivers, the LED driver 404 illustrated in FIG. 4 utilizes a feedback mechanism that permits the output voltage $V_{OUT}$ to be adjusted so as to reduce or minimize the power consumption of the LED driver 404 in the presence of variances in voltage drop across the LED strings 405-408.

In accordance with one aspect of the present disclosure, a method includes generating, at a pulse width modulation (PWM) signal generator, a series of groups of PWM cycles for a PWM signal, each group comprising one or more iterations of a corresponding set of a predetermined number of PWM cycles, whereby a proportion of PWM cycles having a first duty to PWM cycles having a second duty increases for each set in a progression of the series. Generating the series of groups of PWM cycles can comprise: generating a first group of PWM cycles of the series for a first duration, the first group comprising one or more iterations of a first set of PWM cycles, the first set comprising a first subset of PWM cycles having the first duty and a second subset of PWM cycles having the second duty; and generating a second group of PWM cycles of the series for a second duration following the first duration, the second group comprising one or more iterations of a second set of PWM cycles, the second set comprising a third subset of PWM cycles having the first duty and a fourth subset of PWM cycles having the second duty, the third subset comprising a greater number of PWM cycles than the first subset and the second subset comprising a greater number of PWM cycles than the fourth subset. The method further can include timing the first duration and the second duration based on a clock signal. In one embodiment, generating the first group of PWM cycles comprises generating, for each iteration of the first set, the first subset of PWM cycles prior to generating the second subset of PWM cycles, and generating the second group of PWM cycles comprises generating, for each iteration of the second set, the third subset of PWM cycles prior to generating the fourth subset of PWM cycles. The method further can include controlling a current through at least one light emitting diode (LED) string of a display based on the PWM signal.

In one embodiment, the method further includes generating a first plurality of PWM cycles having the first duty based on a first value stored at the PWM signal generator, the first value representative of the second duty. The method also can include receiving, at the PWM signal generator, a second value that is to replace the first value at the PWM signal generator, the second value representative of the first duty, wherein generating the series of groups of PWM cycles comprises generating the series of groups of PWM cycles responsive to receiving the second value. In one embodiment, a number of groups in the series is based on a number of PWM cycles per set and the method further includes determining a number of PWM cycles per set based on a native duty resolution of the PWM signal generator and a predetermined effective duty resolution of the PWM signal generator for a transition in the PWM signal from the first duty to the second duty. The corresponding proportion of PWM cycles having the first duty to PWM cycles having the second duty can be programmable for each set in the progression of the series.

In accordance with another aspect of the present disclosure, a method is provided for a pulse width modulation (PWM) signal generator providing a PWM signal. The method comprises, for each PWM cycle of a sequence of PWM cycles of the PWM signal, generating the PWM cycle so as to have a duty represented by a programmable value. The method further includes, responsive to receiving an updated value representative of an updated duty: iteratively incrementing a first count value responsive to a first clock signal; and resetting the first count value responsive to the first count value reaching a first threshold. The method additionally includes iteratively incrementing a second count value responsive to completion of each PWM cycle of the sequence and iteratively providing a select one of the updated value or a previously-received value for use as the programmable value based on a comparison of the first count value to the second count value. The method further includes resetting the second count value responsive to the second count value reaching a second threshold. In one embodiment, at least one of the first threshold and the second threshold is programmable.

The method further can include determining the first threshold and the second threshold based on a native PWM resolution of the PWM signal generator and a predetermined effective PWM resolution of the PWM signal generator for a transition in the PWM signal to the updated duty. The method also can include controlling a current through at least one light emitting diode (LED) string of a display based on the PWM signal.

In accordance with yet another aspect of the present disclosure, a system is provided. The system includes a pulse width modulation (PWM) signal generator to generate a series of groups of PWM cycles for a PWM signal, each group comprising one or more iterations of a corresponding set of a predetermined number of PWM cycles, whereby a proportion of PWM cycles having a first duty to PWM cycles having a second duty increases for each set in a progression of the series. In one embodiment, the PWM signal generator is to generate a first group of PWM cycles of the series for a first duration, the first group comprising one or more iterations of a first set of PWM cycles, the first set comprising a first subset of PWM cycles having the first duty and a second subset of PWM cycles having the second duty, and the PWM signal generator further is to generate a second group of PWM cycles of the series for a second duration following the first duration, the second group comprising one or more iterations of a second set of PWM cycles, the second set comprising a third subset of PWM cycles having the first duty and a fourth subset of PWM cycles having the second duty, the third subset comprising a greater number of PWM cycles than the first subset and the second subset comprising a greater number of PWM cycles than the fourth subset. The PWM signal generator can include a controller to time the first duration and the second duration relative to a clock signal.

In one aspect, the PWM signal generator generates, for each iteration of the first set, the first subset of PWM cycles prior to generating the second subset of PWM cycles, and the PWM signal generator generates, for each iteration of the second set, the third subset of PWM cycles prior to generating the fourth subset of PWM cycles.

In one embodiment, the PWM signal generator is to generate a first plurality of PWM cycles having the first duty based on a first value stored at the PWM signal generator, the first value representative of the second duty, and to receive a second value that is to replace the first value at the PWM signal generator, the second value representative of the first duty, wherein the PWM signal generator generates the series of groups of PWM cycles responsive to receiving the second value. In accordance with one embodiment, a number of groups in the series is based on a number of PWM cycles per set, and the number of PWM cycles per set is set based on a native duty resolution of the PWM signal generator and a predetermined effective duty resolution of the PWM signal generator for a transition in the PWM signal from the first duty to the second duty. The corresponding proportion of PWM cycles having the first duty to PWM cycles having the second duty can be programmable for each set in the progression of the series.

In one embodiment, the system further includes a display comprising a light emitting diode (LED) string and a current regulator having an input to receive the PWM signal, the current regulator to control a current through the LED string based on the PWM signal.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
generating, at a pulse width modulation (PWM) signal generator, a series of groups of PWM cycles for a PWM signal, each group comprising one or more iterations of a corresponding set of a predetermined number of PWM cycles, whereby a proportion of PWM cycles having a first duty to PWM cycles having a second duty increases for each set in a progression of the series.

2. The method of claim 1, wherein generating the series of groups of PWM cycles comprises:
generating a first group of PWM cycles of the series for a first duration, the first group comprising one or more iterations of a first set of PWM cycles, the first set comprising a first subset of PWM cycles having the first duty and a second subset of PWM cycles having the second duty; and
generating a second group of PWM cycles of the series for a second duration following the first duration, the second group comprising one or more iterations of a second set of PWM cycles, the second set comprising a third subset of PWM cycles having the first duty and a fourth subset of PWM cycles having the second duty, the third subset comprising a greater number of PWM cycles than the first subset and the second subset comprising a greater number of PWM cycles than the fourth subset.

3. The method of claim 2, further comprising:
timing the first duration and the second duration based on a clock signal.

4. The method of claim 2, wherein:
generating the first group of PWM cycles comprises generating, for each iteration of the first set, the first subset of PWM cycles prior to generating the second subset of PWM cycles; and
generating the second group of PWM cycles comprises generating, for each iteration of the second set, the third subset of PWM cycles prior to generating the fourth subset of PWM cycles.

5. The method of claim 1, further comprising:
generating a first plurality of PWM cycles having the first duty based on a first value stored at the PWM signal generator, the first value representative of the second duty;
receiving, at the PWM signal generator, a second value that is to replace the first value at the PWM signal generator, the second value representative of the first duty; and
wherein generating the series of groups of PWM cycles comprises generating the series of groups of PWM cycles responsive to receiving the second value.

6. The method of claim 1, wherein a number of groups in the series is based on a number of PWM cycles per set and the method further comprising:
determining a number of PWM cycles per set based on a specified duty resolution of the PWM signal generator and a predetermined effective duty resolution of the PWM signal generator for a transition in the PWM signal from the first duty to the second duty.

7. The method of claim 1, wherein the corresponding proportion of PWM cycles having the first duty to PWM cycles having the second duty is programmable for each set in the progression of the series.

8. The method of claim 1, further comprising:
controlling a current through at least one light emitting diode (LED) string of a display based on the PWM signal.

9. In a pulse width modulation (PWM) signal generator providing a PWM signal, a method comprising:
for each PWM cycle of a sequence of PWM cycles of the PWM signal, generating the PWM cycle so as to have a duty represented by a programmable value;
responsive to receiving an updated value representative of an updated duty:
iteratively incrementing a first count value responsive to a first clock signal; and
resetting the first count value responsive to the first count value reaching a first threshold;
iteratively incrementing a second count value responsive to completion of each PWM cycle of the sequence;
iteratively providing a select one of the updated value or a previously-received value for use as the programmable value based on a comparison of the first count value to the second count value; and
resetting the second count value responsive to the second count value reaching a second threshold.

10. The method of claim 9, wherein at least one of the first threshold and the second threshold is programmable.

11. The method of claim 9, further comprising:
determining the first threshold and the second threshold based on a PWM resolution of the PWM signal generator and a predetermined effective PWM resolution of the PWM signal generator for a transition in the PWM signal to the updated duty.

12. The method of claim 9, further comprising:
controlling a current through at least one light emitting diode (LED) string of a display based on the PWM signal.

13. A system comprising:
a pulse width modulation (PWM) signal generator to generate a series of groups of PWM cycles for a PWM signal, each group comprising one or more iterations of a corresponding set of a predetermined number of PWM cycles, whereby a proportion of PWM cycles having a first duty to PWM cycles having a second duty increases for each set in a progression of the series.

14. The system of claim 13, wherein the PWM signal generator is to generate a first group of PWM cycles of the series for a first duration, the first group comprising one or more iterations of a first set of PWM cycles, the first set comprising a first subset of PWM cycles having the first duty and a second subset of PWM cycles having the second duty, and the PWM signal generator further is to generate a second group of PWM cycles of the series for a second duration following the first duration, the second group comprising one or more iterations of a second set of PWM cycles, the second set comprising a third subset of PWM cycles having the first duty and a fourth subset of PWM cycles having the second duty, the third subset comprising a greater number of PWM cycles than the first subset and the second subset comprising a greater number of PWM cycles than the fourth subset.

15. The system of claim 14, wherein the PWM signal generator comprises a controller to time the first duration and the second duration relative to a clock signal.

16. The system of claim 14, wherein the PWM signal generator generates, for each iteration of the first set, the first subset of PWM cycles prior to generating the second subset of PWM cycles, and the PWM signal generator generates, for each iteration of the second set, the third subset of PWM cycles prior to generating the fourth subset of PWM cycles.

17. The system of claim 13, wherein the PWM signal generator is to generate a first plurality of PWM cycles having the first duty based on a first value stored at the PWM signal generator, the first value representative of the second duty, and to receive a second value that is to replace the first value at the PWM signal generator, the second value representative of the first duty, wherein the PWM signal generator generates the series of groups of PWM cycles responsive to receiving the second value.

18. The system of claim 13, wherein:
a number of groups in the series is based on a number of PWM cycles per set; and
the number of PWM cycles per set is set based on a native duty resolution of the PWM signal generator and a predetermined effective duty resolution of the PWM signal generator for a transition in the PWM signal from the first duty to the second duty.

19. The system of claim 13, wherein the corresponding proportion of PWM cycles having the first duty to PWM cycles having the second duty is programmable for each set in the progression of the series.

20. The system of claim 13, further comprising:
a display comprising a light emitting diode (LED) string and a current regulator having an input to receive the PWM signal, the current regulator to control a current through the LED string based on the PWM signal.

* * * * *